United States Patent
Meissner et al.

[11] Patent Number: 6,160,824
[45] Date of Patent: *Dec. 12, 2000

[54] LASER-PUMPED COMPOUND WAVEGUIDE LASERS AND AMPLIFIERS

[75] Inventors: Helmuth E. Meissner; Oliver R. Meissner, both of Pleasanton, Calif.

[73] Assignee: Maxios Laser Corporation, Dublin, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/184,913

[22] Filed: Nov. 2, 1998

[51] Int. Cl.$^7$ .................................................. H01S 3/30
[52] U.S. Cl. ................................. 372/7; 372/64; 372/34; 372/10; 372/39; 372/11; 372/19; 372/70; 372/55; 372/105; 372/45
[58] Field of Search .................................. 372/7, 64, 34, 372/10, 39–41, 11, 19, 70, 95, 105, 45

[56] References Cited

U.S. PATENT DOCUMENTS 3,123,953  3/1964  Merkl ........................................ 51/283
3,565,508  2/1971  Dumont .................................. 350/157

(List continued on next page.)

FOREIGN PATENT DOCUMENTS

| | | | |
|---|---|---|---|
| 0 136 050 A1 | 4/1985 | European Pat. Off. | C30B 33/00 |
| 0 232 935 A1 | 8/1987 | European Pat. Off. | H01L 21/18 |
| 0 456 060 A1 | 11/1991 | European Pat. Off. | C30B 33/06 |
| 0 833 418 A1 | 1/1998 | European Pat. Off. | H01S 3/06 |
| 5-255000 | 5/1993 | Japan | C30B 33/06 |

OTHER PUBLICATIONS

Hares, George B., "Composition and Constitution", *Glass Engineering Handbook*, Third Edition, McGraw–Hill, New York, pp. 1–3 to 1–5, 4–4 to 4–11.

Bowman, S.R. et al., "Power Scaling of Diode–Pumped 2–Micron Lasers", NRL Laser Physics Branch, presented at LEOS '93, Nov. 1993, 34 pages.

Lee, H.C. et al., "Single Crystal Composites for EO Applications", Presented at Optics in Montana '91, Topical Meeting on CTH:YAG, Aug. 1991, Big Sky, Montana, 12 pages.

"Design Freatures and Applications of ONYX OPTICS' Crystal Composites", (A product description), ONYX OPTICS, released May 1994, 3 pages.

Fischmeister, H.F. et al., "Preparation, Properties and Structure of Metal/Oxide Interfaces", *Mat. Res. Soc. Symp. Proc.*, vol. 122, (1988), pp. 529–540.

(List continued on next page.)

*Primary Examiner*—Leon Scott, Jr.

[57] ABSTRACT

A compound planar waveguide comprising multiple confinement structures that provides independent containment of pump and laser radiation. The waveguide may be formed of multiple layers of laser-active and laser-inactive materials to provide step changes in refractive index. The planar waveguide may include a central laserable core layer substantially sandwiched by at least two non-laserable cladding layers to provide an interface between the inner surfaces of the cladding layers and the gain medium core to define a first waveguide by virtue of an index of refraction discontinuity for containing developed laser radiation, and wherein the outer surfaces of the cladding layers define a second waveguide by virtue of an index of refraction discontinuity for containing pump radiation within the waveguide. The second waveguide may be also defined by an interface formed between the cladding layers and additional non-laserable external layers which sandwich the cladding layers. The laser waveguide provides confinement of developed laser radiation which may be independently configured from the waveguide structure that confines the pump radiation. The planar waveguide layers may be also optically bonded together and consist of different optical quality crystals or glass.

64 Claims, 5 Drawing Sheets

U.S. PATENT DOCUMENTS

| | | | |
|---|---|---|---|
| 3,579,130 | 5/1971 | Smiley | 372/7 |
| 3,590,004 | 6/1971 | Woodcock | 252/301.4 |
| 3,880,632 | 4/1975 | Podvigalkina | 65/37 |
| 3,963,347 | 6/1976 | Segre et al. | 356/5 |
| 3,978,427 | 8/1976 | Truscott | 331/94.5 P |
| 4,149,902 | 4/1979 | Mauer et al. | 136/89 PC |
| 4,507,787 | 3/1985 | Daly et al. | 372/62 |
| 4,509,175 | 4/1985 | Daly et al. | 372/101 |
| 4,531,809 | 7/1985 | Carter et al. | 350/96.19 |
| 4,638,552 | 1/1987 | Shimbo et al. | 29/576 J |
| 4,671,846 | 6/1987 | Shimbo et al. | 156/629 |
| 4,810,318 | 3/1989 | Haisma et al. | 156/153 |
| 4,935,930 | 6/1990 | Handa | 372/7 |
| 4,983,251 | 1/1991 | Haisma et al. | 156/630 |
| 4,984,246 | 1/1991 | Cabaret et al. | 372/69 |
| 5,013,380 | 5/1991 | Aoshima | 156/250 |
| 5,033,058 | 7/1991 | Cabaret et al. | 372/75 |
| 5,084,888 | 1/1992 | Tajima et al. | 372/39 |
| 5,175,787 | 12/1992 | Gualtieri et al. | 385/130 |
| 5,201,977 | 4/1993 | Aoshima | 156/153 |
| 5,239,549 | 8/1993 | Tajima et al. | 372/39 |
| 5,307,430 | 4/1994 | Beach et al. | 385/31 |
| 5,321,711 | 6/1994 | Rapoport et al. | 372/41 |
| 5,394,420 | 2/1995 | Senn et al. | 372/39 |
| 5,402,437 | 3/1995 | Mooradian | 372/92 |
| 5,418,182 | 5/1995 | Ford | 372/46 |
| 5,441,803 | 8/1995 | Meissner | 428/220 |
| 5,502,737 | 3/1996 | Chartier et al. | 372/11 |
| 5,548,606 | 8/1996 | Senn et al. | 372/39 |
| 5,563,899 | 10/1996 | Meissner et al. | 372/39 |
| 5,846,638 | 12/1998 | Meissner | 428/220 |
| 5,847,865 | 12/1998 | Gopinath et al. | 372/7 |
| 5,852,622 | 12/1998 | Meissner et al. | 372/39 |

OTHER PUBLICATIONS

Lee, H.C. et al., "Diffusion bonded composites of YAG single crystals", *SPIE*, vol. 1624, Laser–Induced Damage in Optical Materials: 1991, (1991)pp.2–10.

Meissner, H.E. et al., "Edge–cladding glasses for solid–state laser garnet crystals", *J. Appl. Phys.*, vol. 62, No. 7, Oct. 1, 1987, pp. 2646–2650.

"High Power, Solid–State Lasers", Session CW1, Proceedings of the '93 Conference on Lasers and Electro–Optics (CLEO'93), May 1993, pp. 274–276.

Rapoport, W.R. et al., "Laser Operation of Cr:LiSAF and Cr:iSGaF Pumped by Alexandrite", *OSA Proceedings on Advanced Solid State Lasers*, vol. 15, (1993), pp. 386–390.

St. Pierre, R.J. et al., "Diode Array Pumped Kilowatt Laser", *IEEE Journal of Selected Topics in Quantum Electronics*, vol. 3, No. 1, Feb. 1997, pp. 53–58.

Black, R.D. et al., "Silicaon and silicon dioxide thermal bonding for silicon–on–insulator applications", *J. Appl. Phys.*, vol. 63, No. 8, Apr. 15, 1988, pp. 2773–2777.

Furukawa, K. et al., "Lattice Configuration and Electrical Properties at the Interface of Direct Bonded Silicon", Extended Abstracts of the 18th (1986 Intl.) Conference on Solid State Devices and Materials, Tokyo, 1986, pp. 533–536.

van Bueren, H.G. et al., "A Small and Stable Continous Gas Laser", *Physics Letters*, vol. 2, No. 7, Nov. 1, 1962, pp. 340–341.

Haisma, J. et al., "Silicon–on–Insulator Wafer Bonding–Wafer Thining Technological Evaluations", *Japanese Journal of Applied Physics*, vol. 28, No. 8, Aug. 1989, pp. 1426–1443.

Tajima, H. et al., "Performance of Composite Glass Slab Laser", *IEEE Journal of Quantum Electronics*, vol. 28, No. 6, Jun. 1992, pp. 1562–1570.

Yen, C.T. et al., "On controlled solidfication studies of some $TiO_2$ binary alloys", *J. Mater. Res.*, vol. 7, No. 4 Apr.1992, pp. 980–991.

Bruesselbach, H. et al., "69–W–average–power Yb:YAG laser", *Optics Letters*, vol. 21, No. 7, Apr. 1996, pp. 480–482.

Bruesselbach, H. et al., "69–W–average–power Yb:YAG laser", *Advanced SSL*, Jan. 31 to Feb. 2, 1996, pp. 194–196.

Webster's Third New International Dictionary, p. 1584, (1961).

Webster's New Collegiate Dictionary, p. 46, (1977).

Brown, C. et al., "Thermally bonded planar waveguide lasers", *Appl. Phys. Lett.*, vol. 71, No. 9, Sep. 1997, pp. 1139–1141.

Owyoung, A. et al., "Stress–induced tuning of a diode–laser–excited monolithic Nd:YAG laser", *Optics Letters*, vol. 12, No. 12, Dec. 1987, pp. 999–1001.

Meisner, H. et al., "Method and Apparatus for Composite Gemstones", U.S. Patent Application Serial No. 09/004,050, filed Jan. 6, 1998, (Attorney Docket No. 16709–1–4–1).

Meisner, H. et al., "Laser Rods With Undoped, Flanged End–Caps for End–Pumped Laser Applications", U.S. Patent Application Serial No. 09/063,873, filed Apr. 21, 1998, (Attorney Docket No. 016709–3).

LASER-PUMPED COMPOUND WAVEGUIDE LASERS AND AMPLIFIERS

FIELD OF THE INVENTION

The present invention is generally directed to solid state laser apparatus. More particularly, the invention relates to optically pumped compound planar waveguide devices.

BACKGROUND OF THE INVENTION

A common goal in laser systems is to provide devices with good beam quality that operate in an efficient manner. One technique for generating radiation having good transverse beam quality is to use a laser resonator that is relatively small in its transverse dimensions so that only diffraction limited or near diffraction limited transverse modes are supported by the resonator. In conventional rod-shaped laser resonators, this may be accomplished using pinholes or apertures in the laser cavity, or by only pumping or exciting a very limited transverse area in the gain medium. However, one drawback of this rod laser approach, in which only a limited transverse gain region is used, is that the small volume effectively limits the amount of energy that can be stored or the power that can be extracted by the laser system. In those cases in which pinholes are not used, but the excitation of the medium is limited to a small transverse area, one drawback is the difficulty encountered in designing an excitation source. In general, such small-excited volume systems use an end-pumping geometry in which a laser provides an excitation source to deliver the pump power into a well-defined region through the end of the laser rod. This approach similarly suffers from energy storage and extracted power limitations. In laser resonators that extract high beam quality radiation from a transverse region that is large compared to that which would be required to support only a diffraction limited mode, it may be possible to use an unstable resonator structure. The unstable resonator structure, however, exhibits high diffractive losses, and is thus limited in general to high gain laser systems.

Guided wave optics is largely based on the physical phenomenon of total internal reflection. It has important applications in the fabrication of miniaturized optical and opto-electronic devices where light radiation is confined within a defined region. An optical waveguide may be considered a light conduit consisting of a slab, strip or cylinder of dielectric material surrounded by materials with a lower refractive index. Optical dielectric waveguides are generally constructed of a guiding layer, a substrate and a cover layer. The guiding layer has a higher refractive index than the substrate and the cover layer to confine optical radiation by total reflection upon the walls separating it from the other two. Optical waveguides are discussed in "*Fundamentals of Photonics*" by B. E. A. Saleh and M. C. Teich (John Wiley 1991). In particular, a planar dielectric waveguide may be considered a conceptually simple two-dimensional design formed with a central slab of a medium of propagation with a higher refractive index. This guiding slab may also be described as a core. The upper and lower media of the structure are generally formed of a material with a lower refractive index. The lower medium may also be characterized as a substrate. When the upper medium has the same refractive index as the lower one, then the waveguide may be referred to as symmetrical. In addition, the upper medium may be simply surrounding air or another medium with a refractive index that is different from the substrate. The planar waveguide may be referred to as asymmetrical in these instances. A planar dielectric guide, however, generally does not provide confinement along the plane of the substrate. Dielectric strip or channel waveguides, which are also called three-dimensional guides, can provide this additional type of radiation confinement. Among strip waveguides, the most common includes those that are formed with a raised strip, an embedded strip and a rib or ridge or a strip loaded guide.

A waveguide laser generally includes a guiding layer with at least one lasant ion. By optically confining both the pump radiation and the developed laser radiation to very thin structures, sufficient gain may still be generated from many ion-host combinations. The resulting gain, which may be offered by a particular waveguide configuration, enables a range of optical resonator designs that are conducive to producing near diffraction limited and diffraction limited output beams. For example, U.S. Pat. No. 4,679,892 describes passive and active waveguide components and devices produced by liquid phase epitaxy and photolithography with garnet crystals of different refractive index. This technique may be particularly applicable to magneto-optical devices. In addition, U.S. Pat. No. 5,502,737 describes the fabrication of waveguide laser structures by epitaxial growth of crystal layers from a liquid phase. Although this technique may be applied to the fabrication of planar waveguides, it imposes serious limitations on the choice of waveguide core and substrate material combinations due to lattice matching requirements for liquid phase epitaxy. To increase the refractive index of the guiding core, it may be necessary to co-dope the flux of it with ions such as Ga, Ge or Lu. This may undesirably alter the spectroscopic lasant properties of the core crystal, as by way of example manifested as line broadening. It may be necessary to match the crystal structure of substrate and guiding layers, thus making it particularly difficult to design waveguide lasers with a large numerical aperture that have the same desirable lasant characteristics as a bulk rod or slab laser. While waveguides of dissimilar materials such as single crystalline silicon on sapphire are known and have been used for the fabrication of modulators and switches, as described in U.S. Pat. No. 4,904,039, analogous structures of guiding layers of dielectric crystals or glasses for solid state lasers cannot be grown in general, presumably because stresses between these dissimilar materials may not provide stable configurations.

Another waveguide approach includes the use of diode-pumped fiber lasers. In general, diode-pumped single-mode fiber lasers have demonstrated an ability to generate high beam quality laser radiation in which the diode pump radiation may be confined to a relatively large core as opposed to just the single-mode core that contains the active lasant material. This fiber approach has generated a recent resurgence of interest for applications requiring output powers of 10 W or more. Although, in principle, such fiber lasers can be q-switched, they are limited in their peak power generation by physical processes such as Raman scattering. The Raman scattering threshold, which for single-mode fibers that are several meters in length is on the order of 10 $GW/cm^2$, may limit the pulse energy and pulse widths that can be generated using the fiber laser approach. If this Raman threshold is exceeded, the laser output may be dominated by the Raman spectrum resulting in a broad super-continuum. This may be unacceptable for the majority of applications that require either single frequency or narrow band output pulses.

The operation of the first glass or crystal planar (non-fiber geometry) waveguide laser is open to interpretation depending specifically on how the thickness of a thin waveguide is defined. The early demonstration of a laser using a 50 $\mu$m thick LiNdP$_4$O$_{12}$ gain element, pumped by an Ar-ion laser, may be considered to be the first open literature report of the successful operation of a system that took advantage of and recognized the potential for planar crystalline structures. (K. Kubodera, J. Nakano, K. Otsuka and S. Miyazawa, A slab waveguide laser formed of glass-clad LiNdP4O12, J. Appl. Phys. 49, pp. 65–68 (1978)). However, this initial demonstration employed a waveguide that was approximately an order of magnitude thicker than that which is generally required to support only single transverse mode operation in the waveguiding dimension. Furthermore, these waveguides were deposited by RF sputtering onto glass substrates and suffered from scattering losses. Since this initial demonstration, there have been many others using various laser systems to serve as pump excitation sources for various ion-host combinations. The most recent developments in the field of waveguide lasers have been associated with using semiconductor laser diodes as pump sources. Using such semiconductor pump sources, known pumping schemes for slab-type waveguide lasers have involved the use of coupling optics such as a spherical lens to focus a diode pump beam into the lasing core of the waveguide. The use of intermediate coupling optics between the semiconductor laser pump array and the waveguide core is warranted in many of the developed systems by the highly divergent nature of the laser diode light. Because of the high divergence of the radiation emitted by a diode bar, there is a need to collect and collimate the light so that it can be delivered to the laser waveguide core with some efficiency. Typically, reported waveguide lasers use simple two layer, or three layer structures, in which the lasing core is either located on one side, or positioned between, a cladding material that has slightly lower index of refraction than the core. This step in refractive index is what permits the confinement of both the pump radiation and the developed laser radiation. One disadvantage of waveguide lasers with laser diode pump excitation sources is that the requirement of generating an output beam with high beam quality runs counter to the requirement of achieving simple and efficient pump laser radiation confinement. This conflict basically arises because in order to achieve efficient and simple pump confinement, it is often desirable to have a confining structure with a high numerical aperture, or in other words, a confining structure defined by an interface with a large step in the value of refractive index from one side to the other. The larger the numerical aperture of the waveguide, the larger the spread in angle of pump radiation that will be confined by the waveguide. However, a structure with a large numerical aperture will support a larger number of transverse lasing modes beyond the desired diffraction limited or fundamental mode than will a structure with a small numerical aperture. Because the spatial quality of a laser beam can be related to the number of transverse modes it contains beyond the fundamental mode, it is generally desirable to limit the numerical aperture that serves to confine the developed laser radiation. Because the same confinement structure is generally used for both the pump and the developed laser radiation, it is often necessary to compromise waveguide laser designs in current configurations given that both output laser beam quality and pump radiation confinement cannot be independently optimized.

SUMMARY OF THE INVENTION

The apparatus described herein provide solid state waveguide lasers and amplifiers with high beam quality for a wide variety of commercial, military, and scientific applications. Various aspects of the invention may further provide a complete waveguide laser system that incorporate optical bonding techniques described herein to fabricate a crystalline or glass waveguiding laser medium. The laser medium may have a thickness appropriate for the generation and propagation of a low order transverse mode in the waveguiding dimension. Furthermore, the invention may be modified to include laser diode pumping, q-switching, cooling, and packaging aspects of solid state waveguide laser systems.

An object of the invention is to provide a compound waveguide structure in which the developed laser radiation is confined by a waveguide structure that has a relatively smaller numerical aperture than another independent waveguide structure used to confine the pump radiation. The waveguide structure that confines the developed laser radiation may be independently modified from the waveguide structure that confines the pump radiation. The invention permits the independent optimization of laser systems to give high transverse mode output beam quality as well as efficient and simple pump radiation confinement. Alternatives are further provided for designing and producing efficient and compact waveguide laser systems with high beam quality. Compound waveguides may be provided when dissimilar materials such as YAG and sapphire are bonded together. For example, a Yb$^{3+}$ laser may be pumped at 940 nm and lasing at 1.03 $\mu$m. The central layer may provide a lasing layer consisting of Yb doped YAG which has been fabricated from a bulk crystal. Cladding on each side of the Yb:YAG layer may be formed as layers of undoped YAG which are also fabricated from bulk crystal. Because the Yb:YAG has a slightly higher refractive index than the undoped YAG, the interface between may confine the developed 1.03 $\mu$m laser radiation in a waveguide characterized by a small numerical aperture. Pump radiation confinement may be further defined by using two more layers, such as sapphire, on the outside of the YAG-Yb:YAG—YAG structure. Because the refractive index difference between sapphire and undoped YAG is relatively greater than the refractive index difference between undoped YAG and Yb:YAG, the pump confinement waveguide has a relatively larger numerical aperture than the developed laser radiation confinement waveguide. The same basic waveguide structure may be applicable of course to many ion-host combinations beyond the Yb:YAG laser. In particular, there are a multitude of choices for the lasing ion as well as the various layers that make up the waveguide. Additionally, the layers that make up the waveguide may be optically bonded together forming step changes in refractive index, and these various layers may also consist of different optical quality crystals or glasses. The components for each laserable waveguiding layer may originate from bulk crystals of defined properties, and remain unchanged in their desirable lasing parameters during the fabrication process.

Waveguide lasers formed in accordance with the invention may be laminated structures that function to generate laser radiation when optically pumped. Such waveguide lasers that are excited using laser diode arrays may have distinct and separate waveguide structures for confining the output radiation developed by the laser system independently from the pump radiation used to excite the laser system. The layers that comprise the waveguide structure may be composed of various optical quality glasses and crystals that are joined together using an optical bonding technology. Using optical quality glasses and crystals with different and appropriately chosen refractive indices in a given structure effectively provide and form the radiation confining waveguides. At least one of the layers in the waveguide structure may be doped with an active lasant ion that generates laser radiation upon being excited with pump radiation from a laser diode array. Because these waveguide structures confine both the pump and the developed laser radiation to a relatively smaller active volume, it is possible to develop and maintain high pump and extraction irradiances in the laser. This in turn provides many efficient laser systems having lasants that may conventionally be capable of developing only small gains. A multitude of oscillator and amplifier configurations are also compatible with the waveguide structures provided herein, and of particular interest, these oscillator and amplifier configurations may lead to relatively high beam quality output laser radiation.

Another object of the invention is to provide a substantially planar compound waveguide lasing device. The device may comprise a compound five-layer planar waveguide positioned between two optically coated opposing surfaces configured for laser oscillator operation. The waveguide may include a central core layer consisting of a laserable medium with a refractive index $n_1$, two inner laser-inactive cladding layers with a refractive index $n_2$ wherein the core layer is sandwiched between the two inner cladding layers, and two outer laser-inactive cladding layers with a refractive index $n_3$ wherein the core layer and the inner cladding layers are sandwiched between the two outer cladding layers. The respective refractive indices may be selected such that $n_1 > n_2 > n_3$. An optical pump radiation source such as a laser diode may be further provided for transmitting pump radiation to the core and inner cladding layers to generate laser radiation output from the planar waveguide. The optical pump radiation may be transmitted through an anti-reflective optical coating. In addition, various layers of the compound waveguide may be formed with various dimensions and thicknesses, and may be joined with an optical adhesive-free bond such as a thermal bond. A cooling system in thermal contact with the planar waveguide may be also included for removing heat from the planar waveguide.

In yet another embodiment of the invention, a three-layer planar waveguide lasing device may be provided. The planar waveguide may be positioned between two optically coated opposing surfaces configured for laser oscillator operation having a core layer of laserable medium with a refractive index $n_1$. A pair of planar cladding layers with a refractive index $n_2$ may be also included wherein each individual cladding layer is positioned substantially adjacent to an external planar surface of the core layer, and where $n_1 > n_2$. The lasing device may further include an optical pump radiation source for transmitting pump radiation to the core and inner cladding layers which generates laser radiation output. The waveguide layers may be joined using an adhesive-free bond. The apparatus may also include cooling blocks for removing heat from the planar waveguide. In addition, the planar waveguide lasing device may further comprise a first and a second external layer formed of non-laserable material that are respectively positioned adjacent to exterior surfaces of the planar cladding layers. A multiple waveguide structure may be thus provided wherein a waveguide for confinement of developed radiation is formed by the interface between the core and inner cladding layers, and a pump radiation waveguide is formed by the interface between the inner cladding layers and either the non-laserable external layers or the surrounding environment.

An optically pumped solid state planar waveguide amplifier is further provided in accordance with the concepts of the invention. A planar medium capable of sustaining a population inversion may be centrally disposed along an optical axis formed along the direction of the incoming light rays. A pair of planar cladding layers may be separately bonded to the upper and the lower surface of the planar medium. The interface between the inner surfaces of the cladding layers and the planar medium may define a first waveguide by virtue of a first index of refraction discontinuity for spontaneous emission of the medium, and the outer surfaces of the cladding layers may also define a second waveguide by virtue of a second index of refraction discontinuity for containing radiation from the optical pump source. The amplifier may have coatings on its external surfaces that are anti-reflective to the pump radiation wavelength, and may include cladding layers joined with an adhesive-free bond. The two planar cladding layers may be formed of a first non-lasing dielectric medium. Additionally, external layers formed of a second non-lasing dielectric medium may be positioned respectively adjacent to the outer surface of each planar cladding layer to provide a second waveguide by virtue of the index of refraction discontinuity at the interface between the first and the second non-lasing dielectric medium. The optically pumped waveguide amplifier may further include chill bars or other cooling systems in thermal contact with the amplifier.

The invention may further provide an optically pumped waveguide laser comprising a pair of reflective mirrors defining an optical cavity with an optical axis, and a planar waveguide disposed along the optical axis. The planar waveguide may include a gain medium layer and two planar cladding layers each defined by an inner surface and an outer surface. The inner surface of each cladding layer may be respectively bonded to the upper and the lower surface of the gain medium layer. The interface formed between the inner surfaces of the cladding layers and the gain medium layer may define by virtue of an index of refraction discontinuity a first waveguide for spontaneous emission of the medium. The outer surfaces of the cladding layers may define by virtue of an index of refraction discontinuity a second waveguide for containing radiation within the waveguide. The waveguide laser may further include laser diodes or other optical sources for providing pump radiation to the waveguide across at least one side surface of the planar waveguide. At least one reflective mirror can be mounted relatively external to the gain medium or formed as a monolith with the gain medium. Moreover, an external cylindrical lens may be positioned between the optical pump source and the planar waveguide. The apparatus may also have a first and a second external layer formed of a laser-inactive medium wherein the first and the second external layer is respectively positioned substantially adjacent to the outer surface of each cladding layer.

DETAILED DESCRIPTION OF THE INVENTION

The present invention provides compound waveguide structures for laser devices and optical amplifiers. The devices described herein are well-suited for many applications including high performance and compact laser and amplifier systems. A variety of output powers, ranging below 1 watt to several kilowatts or more, may be readily obtained by applying proper scaling techniques to the waveguide laser and amplifier structures described herein. It will be understood that the described features of the following embodiments may be considered individually or in combination with other variations of the invention.

Figure 1:
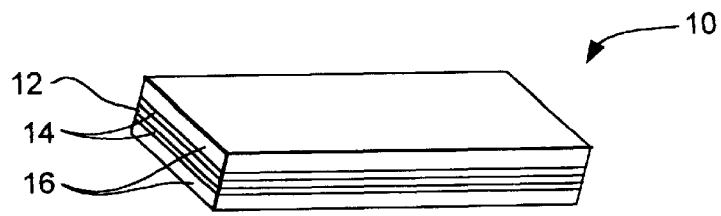
FIG. 1 is a simplified perspective illustration of a compound waveguide laser gain element formed in accordance with the invention that is configured to direct or confine pumped radiation within a central region.

FIG. 1 illustrates a compound waveguide laser gain element 10 formed in accordance with the concepts of the invention. The planar structure 10 may consist of a number of relatively thin layers distinguished from neighboring layers in terms of their refractive index and whether active laser ions are present that are capable of generating laser radiation. The various layers within the waveguide structure may be formed of different glass or crystalline materials joined together at their interfaces using an optical bonding technology as described in U.S. patent applications Ser. No. 08/713,436 entitled SOLID STATE LASERS WITH COMPOSITE CRYSTAL OR GLASS COMPONENTS and Ser. No. 08/580,730 entitled COMPOSITE OPTICAL AND ELECTRO-OPTICAL DEVICES which are incorporated herein by reference. The waveguide 10 may include at least two separate pump and laser radiation confinement structures formed within the illustrated five-layer element having a central layer 12 and surrounding pairs of inner 14 and outer 16 cladding layers. The central layer 12 may contain active lasant ions for generating the laser radiation, and the interfacial surfaces on its top and bottom surfaces adjacent to relatively inner layers 14 may confine or direct the laser radiation developed within the central layer. The pair of relatively inner layers 14 may be positioned adjacent to the central layer 12, and the pair of relatively outer layers 16 may be in turn positioned adjacent to the inner layers. The relatively inner layers 14 may have an intermediate refractive index value in between those of the central layer 12 and the two outer layers 16. At the same time, the central layer 12 may have the relatively highest index of refraction relative to all other waveguide layers. Laser diode array bars (not shown) may thus inject pump excitation radiation into a discrete pump region that at least includes the central lasing layer 12 and adjacent inner layers 14. With the existing differences in indices of refraction, the pump radiation may be confined to a pumped region defined by the interface formed between the inner 14 and the outer 16 layers, and the generated laser radiation may be confined within the substantially parallel central layer 12.

The refractive indices of the central 12, inner 14 and outer 16 layers denoted by $n_1$, $n_2$ and $n_3$, respectively, may be selected such that $n_1 > n_2 > n_3$. Furthermore, increased performance may be observed in particular applications when the step in index between levels as to the central layer 12 and inner layers 14, $n_1 - n_2$, is relatively smaller than the step in index between levels as to the inner layers and outer layers, $n_2 - n_3$. The waveguide devices described herein may demonstrate improved transverse mode quality output radiation in the waveguiding dimension (the relatively vertical dimension of the waveguiding element shown in FIG. 1) when the waveguide is designed to selectively support the fundamental mode in the waveguide dimension. The number of transverse modes that may be supported in the waveguiding dimension by the central layer is generally related to the thickness of the central layer and the index step between the central layer and directly adjacent layers such as the inner layers. For example, when considering symmetric waveguides and transverse electric (TE) modes, the total number of modes that may be confined by the central layer of the waveguide structure is given by equation (1):

$$INT\left\{\sqrt{n_1^2 - n_2^2}\,\frac{2t_1}{\lambda}\right\} + 1, \tag{1}$$

where $t_1$ is the thickness of the central waveguiding layer, $\lambda$ is the vacuum wavelength of the radiation generated in the waveguide which is to be confined to the central layer, and INT means taking only the integer part of the expression in the parenthesis. It may often be desirable to make the thickness of this central layer as large as possible, but not so large that it starts to let the next mode beyond the fundamental diffraction limited mode be confined. This may insure that only the diffraction-limited mode is supported by the waveguide structure and provide an output beam having relatively high beam quality in the waveguiding dimension. A reason for selecting a relatively high thickness for the central layer within the mode consideration limits just described may be generally related to the observation that the thicker the central layer, the more strongly the diode pump radiation is absorbed by the central layer. Using this criterion, a preferable thickness for the central layer may be represented by the following expression (2):

$$t_1 \cong \frac{(\lambda/2)}{\sqrt{n_1^2 - n_2^2}}. \qquad (2)$$

Although the forgoing analysis is primarily directed for TE modes, there is an analogous treatment for other modes including transverse magnetic (TM) modes. TM modes may be generally characterized by a slightly weaker confinement than TE modes i.e., for equivalent mode numbers, and it has been observed that TM modes may be less confined than TE modes. As shown in FIG. 1, the interfaces that define the confinement region of the pump radiation are distinct from those that define the confinement of the generated laser radiation. The step index which provides confinement of the pump radiation, $n_2$–$n_3$, may be independently selected or chosen as large as desired without regard to modal considerations of the generated laser radiation which is confined to the central layer. The pump radiation may be confined or limited to the central 12 and relatively inner 14 layers. Although it may be possible for higher order transverse laser mode to be contained within these three layers, this will not generally occur because of the higher gain experienced by laser radiation confined to the central layer 12 where the laser gain is located. Choosing the step index between the inner 14 and outer 16 layers to be larger than the step index between the central layer and the inner layers can more readily provide efficient confinement of the delivered pump radiation. In particular, the pump radiation may generally exhibit lower mode quality than the generated laser radiation in the central layer 12 because of relatively better confinement provided by the higher step index between the inner layers 14 and the outer layers 16 than between the central and inner layers. In addition, the numerical aperture (NA) of a waveguide provides a measure of the angular spread in radiation that may be confined by a waveguide. The NA may be defined as the sine of the half-angle of the radiation, measured external to the waveguide, which can be confined by the waveguide. Considering the interfaces responsible for confining the pump radiation, the NA of the pump waveguide may be given by equation (3):

$$NA = \sqrt{n_2^2 - n_3^2}. \qquad (3)$$

If pump radiation is directly emitted from laser diode bars in which the half-angle of the emitted diode radiation can be on the order of 30°, it is often desirable to provide a waveguide for pump confinement with an NA equal to sine (30°)=0.5. For example, preferable waveguides defined by interfaces between undoped yttrium aluminum garnet crystals (YAG) and sapphire produce an NA value of 0.46 which has been observed to effectively confine laser diode array pump radiation.

Figure 2:
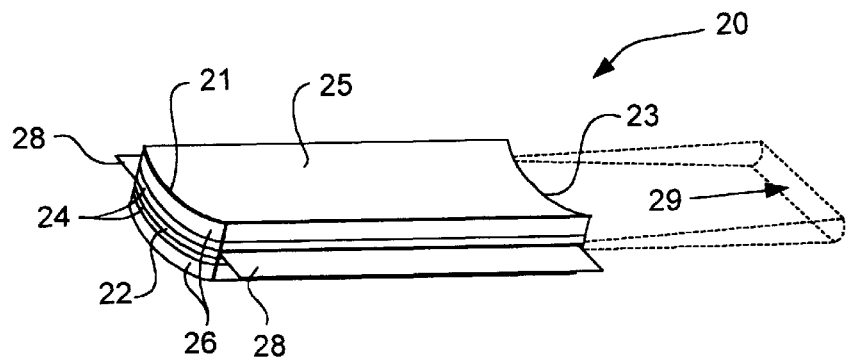
FIGS. 2–2A illustrate a planar compound waveguide consisting of five layers with shaped end surfaces that is positioned in proximity to semiconductor laser diode bars to provide an unstable resonator configuration.

A waveguide lasing device 20 formed in accordance with the concepts of the invention is shown in FIG. 2. The device 20 may include a five-layer compound planar waveguide element 25 positioned between two optically coated opposing surfaces configured for laser oscillator operation. The opposing surfaces may be end or side faces of the element 25, and may include either an optical coating or external mirrors. The optically coated surface may be monolithically formed with the waveguide 25 or provided on a discrete external optical element or mirror. The planar waveguide lasing device 20 may be configured as an unstable laser resonator for providing laser oscillation. The unstable resonator configuration may be obtained with or without a monolithic confocal spherical resonator arrangement with spherical cavity faces. Furthermore, the compound waveguide 25 may consist of a central core layer 22 consisting of a laserable gain medium with a refractive index $n_1$. The laserable core 22 may be formed of a variety of materials capable of achieving population inversion to produce the lasing effect. In addition, the core layer 22 may be sandwiched between the two inner cladding layers 24 having a refractive index $n_2$. Two outer laser-inactive cladding layers 26, which have a refractive index $n_3$, may in turn sandwich both the core layer 22 and the inner cladding layers 24. The differences of refractive indices between the various layers may be selected such that $n_1 > n_2 > n_3$. As shown in FIG. 2, the lasing device 20 may further include an optical pump radiation source 28 for transmitting pump radiation to the core 22 and inner cladding 24 layers to generate laser radiation output. The optical pump radiation may be substantially absorbed in the core layer 22 in at most two passes through the waveguide 25. The waveguide 25 may be defined by at least two opposite side or end surfaces so that optical pump radiation from a source such as a laser diode enters and exits through these opposing surfaces of the waveguide. A variety of substantially anti-reflective optical coatings at the pump wavelength may be deposited onto the side surfaces of the waveguide 25 through which the pump light is transmitted in order to enable transversal pumping. The optical pump radiation may be transmitted to the waveguide sides in a direction perpendicular to the optical axis or the direction of propagation of the generated laser radiation 29. This selective passage of radiation at the pumping wavelength may be accomplished without the aid of intermediate lenses or fibers to at least one waveguide side. Alternatively, the optical pumping radiation may be transmitted through an optically coated end surface having dichroic properties that is anti-reflective or transmissive at the pump wavelength but reflective at the lasing wavelength. The pump radiation may be thus injected into the planar waveguide 25 in a selected direction that is either substantially perpendicular or parallel to the optical axis, or in the direction of propagation of the generated laser radiation.

The laserable medium 22 may include an optically inert host lattice and an optically active species. The refractive index difference between the laserable core layer 22 and the inner cladding layers 24 may be established by different crystallographic orientation of the same crystal host. For example, a variation of invention may include a central core layer with at least one laserable ion contained in yttrium aluminum garnet (YAG) crystal structure as a host lattice that is substantially sandwiched by inner cladding layers consisting of laser-inactive undoped YAG and outer cladding layers consisting of sapphire. The laserable medium of the core layer may be formed of YAG doped with at least one ion or combination of elements selected from the group consisting of rare earth elements including Cerium, Praseodymium, Neodymium, Promethium, Samarium, Europium, Gadolinium, Terbium, Dysprosium, Holmium, Erbium, Thulium, and/or Ytterbium, and third-transition metals such as Chromium, Titanium, and Cobalt. In addition, the core layer 22 and the inner 24 and outer 26 cladding layers may be selected from fluoride single crystals. The core layer 22 and the inner 24 and outer cladding 26 layers may be respectively formed of laser-active and laser-inactive fluoride, fluorophosphate, silicate or phosphate glasses. In a particular embodiment, the core layer may be formed of $Cr^{2+}$:ZnSe and the inner cladding layers may be formed of ZnSe. The core may also include $Cr^{3+}$ ions admixed as laserable ions in an optically inert single-crystalline host lattice. Additionally, the central waveguide core 22 may include $Cr^{4+}$ ions admixed to a laserable material resulting in passively q-switched laser operation. The core layer 22 may include a bonded segment of $Cr^{4+}$:YAG located either on one end or in the interior part of the core layer. One or more sides of the segment may be in contact the central rare-earth doped YAG layer and sandwiched between undoped YAG pump cladding layers. The planar waveguide may be thus configured for passively q-switched lasing operation permitting the generation of short q-switched output pulses with pulse durations from approximately 0.5 to 50 nanoseconds. The central or laserable layer 22 may be thus formed as a compound core structure where all segments or portions may have a similar refractive index but are not all laser-active.

Selected component layers of the waveguide 25 may consist of glass with essentially similar viscosity, and may be joined with an optical or adhesive-free bond. Direct contact between various surfaces of the layers may be verified with optical measuring techniques. The bonding of the compound planar waveguide 25 may be also thermally assisted with controlled direct heating that does not necessarily rise to the level of diffusion temperature ranges. In particular, the core layer 22 may be optically bonded or directly bonded with thermal energy to the inner cladding layers 24. The waveguide 25 may be formed by thermal bonding from a preform structure that is thermally redrawn with proportionate cross-sectional dimensions. Moreover, the core layer 22 may be formed of variable thickness including a range from approximately 3–15 microns. The inner cladding layer 24 may each have a thickness range of approximately 5–15 microns, and the outer cladding layer 26 may each have a thickness range of approximately 200–4000 microns. Each layer may be formed with similar dimensions such as 1 cm in length and 5 mm in width. The planar waveguide lasing device 20 may further include a cooling system (not shown) that is in thermal contact with the planar waveguide for removing heat from the planar waveguide. Cooling bars or elements within the cooling system may be positioned substantially adjacent to or near the waveguide to effect heat transfer typically through convection, radiation or conduction. At least one advantage of the waveguide lasers provided herein over other conventional rod laser geometries includes the ease with which high-average-power thermal loads can be dissipated without incurring excessive temperature rises in the lasing medium. Generally, for uniformly heated structures, i.e., those in which the heat source is located uniformly throughout their volume, the center-to-edge temperature rise scales as the thickness of the volume to the second power. For example, a rod laser with radius r may have heat removed from the cylindrical surface of the rod, and the temperature rise from the center of the rod to its edge will scale as $r^2$. In a waveguide laser, in which the heat generation is confined to the central layer containing an active lasant ion, the temperature rise across this layer generally scales as the thickness of the central layer to the second power, i.e., $t^2$. Because typical rod radii for 10 W to 100 W lasers generally measure from mm to cm, while the range of preferable waveguide central layer thickness of the present waveguides are generally on the order of 10 microns (0.01 mm), the temperature rise across the central gain loaded layer of the waveguide may be orders of magnitude less than the temperature rise across the radius of a comparable average power laser rod. In many laser systems where the temperature of the lasing material may be controlled to achieve efficient operation, this reduced temperature rise in the waveguides provided herein may provide particular advantages over other conventional rod laser geometries. Problems relating to thermal distortions with waveguide lasers in general may be significantly reduced, and more aggressive thermal management may be available for quasi-three-level lasers and other systems that suffer from ground state reabsorption losses such as $Yb^{3+}$, $Tm^{3+}$, and $Er^{3+}$.

As shown in FIG. 2, two semiconductor laser diode bars 28 may operate as pump excitation sources juxtaposed adjacent to the sides of a waveguide 25. The laser diode bars 28 may emit pump radiation directly into the central region or pump radiation-guiding portion of the waveguide 25. The sides of the waveguide laser 20 may have an applied anti-reflective optical coating at the pump wavelength to increase the coupling efficiency of the pump radiation into the waveguide. The waveguide crystal 25 itself may be configured with either spherical or cylindrical surfaces on each of its ends to form an unstable resonator in the unguided direction or other appropriate laser oscillator. The configuration may provide high beam quality laser radiation generated in the central layer 22 of the waveguide in both the guided and unguided dimensions. The waveguide structure 25 itself may control the beam quality in the guiding dimension by allowing only a single or a small number of transverse laser modes to be confined in the central guiding or laser radiation layer 22. The unstable oscillator structure may also control the beam quality in the larger unguided dimension using principles that are well known to those of ordinary skill. Optical coatings may be directly applied to waveguide ends to form a monolithic resonator structure which includes the application a high-reflective optical coating on one end, and a partially reflective optical coating on the other end of the waveguide. Various configurations for the optical coating on the output end of the laser waveguide may be of course selected such as dot reflectors or graded reflectivity coatings in order to enhance beam quality in the unguided dimension. In situations where high mode quality may not be required in the transverse or unguided dimension, ordinary stable oscillator configurations may be employed.

The diode bars 28 in FIG. 2 may be located along the side of the waveguide laser 20 to permit their emission of pump radiation directly into the central region of the waveguide consisting of the central 22 and inner 24 layers. High beam quality may be achieved by using one ore more laser diode array bars as sources that inject pump radiation into relatively thin planar structures consisting of glass or crystalline materials. Because the waveguide laser 20 may confine both the pump radiation and the developed laser radiation, it may be possible to develop high gains that permit the use of an unstable resonator in the non-guided direction. Unstable resonators in one dimension are also known as strip unstable resonators, and are known in the field. In FIG. 2, the unstable resonator, also known as a confocal unstable resonator, the internally extracted laser beam is collimated as it travels away from the high reflector (HR) end 21 of the laser cavity and toward the output coupler (OC) end 23 of the cavity. With confocal unstable resonators, the radius of curvature of the high reflector is related to the radius of curvature of the output coupler and the axial length of the resonator structure by expression (4):

$$R_{HR} - R_{OC} = 2l \qquad (4)$$

where $R_{HR}$ and $R_{OC}$ are the radii of curvature of the HR and OC, respectively, l is the cavity length, and the orientation of the end face curvatures are as shown in FIG. 2. The laser diode bars 28 pump the waveguide structure 25 through its sides which may include an anti-reflection coating at the pump wavelength to increase the transmission of the pump light into the laser cavity. The output beam may be emitted from the output coupler end 23 of the waveguide structure 25.

In accordance with another embodiment of the invention, a waveguide oscillator design may be selected for generating 10 W of output radiation at 1.029 µm using pump diodes at 940 nm. The central laserable layer may be composed of 15 atomic % $Yb^{3+}$:YAG with refractive index 1.821, and may have a thickness of approximately 6 µm. By using the given index values for the central layer and the inner pump cladding layers, application of equation (2) yields 6.03 µm as the maximum core thickness that may still preclude the lasing of the next mode above the fundamental mode in the waveguide dimension. The inner pump cladding layers may be composed of undoped YAG with a refractive index of 1.819, and would also be 6 µm thick. The outer layers may be composed of sapphire with a refractive index of 1.76. With these index values, the diode pump light may be confined by a waveguide having a NA of 0.46, which means that it may capture light emitted from the diode bar at up to 27.3° from the optic axis. This may permit efficient capture of radiation emitted from laser diode bars without the need for any intermediate coupling optic.

Figure 2A:
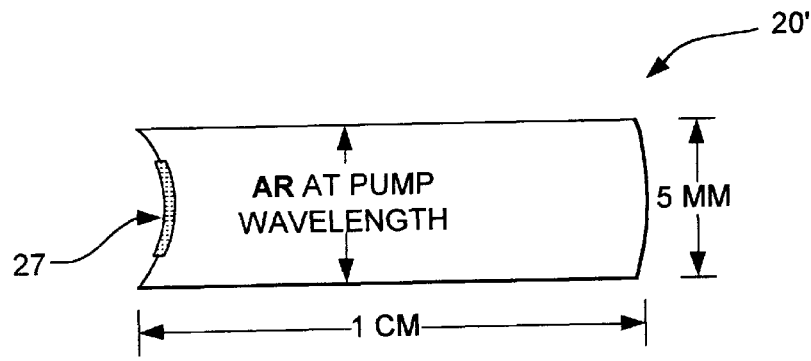

FIG. 2A describes another waveguide structure 20' that may be formed in accordance with the invention for developing high beam quality radiation in the non-guided dimension with an unstable resonator architecture. The unstable resonator is a confocal design in which the radii of curvature of the output coupler and the high reflector satisfy equation (4), and the intracavity laser beam traveling toward the left in FIG. 2A, i.e., toward the output coupler, is collimated. By using two 10 W cw 940 nm pump diode bars, a simple energetics model of the system suggests a greater than 10 W of cw output power using an effective output coupler reflectivity of 33%. The cavity may have a geometric magnification of 1.5, which means the desired effective output coupling reflectivity of 33% can be realized by coating the central 3.33 mm of the 5 mm wide output aperture with a coating 27 having a reflectivity of 50% at 1.03 µm, and coating the remaining outlying portion of the output coupler aperture with a coating that is anti-reflective at 1.03 µm.

While these waveguide lasers employ the difference in refractive index between doped YAG as a core layer, undoped YAG as a cladding layer for cladding pumping, and sapphire as a substrate, many other combinations are possible. Among other useful combinations, in general, there are doped oxide or fluoride crystals that may provide a core, undoped oxide or fluoride crystals as a cladding layer, and different crystals or glasses of appropriate refractive index as substrates. In situations where the difference between doped and undoped uniaxial crystals, especially at low dopant levels, is not sufficient for proper waveguiding operation, the difference in refractive index between the ordinary and extraordinary crystallographic orientations may be exploited. Similarly, choosing available optical glasses of different refractive index may allow the construction of a waveguiding device according to the invention. Yet another embodiment includes the use a lutetium-analog of an yttrium based laser host crystal for both the doped and cladding layers, and undoped yttrium crystal as the substrate. For example, doped LuLiF, undoped LuLiF and YLF layers can be designed for waveguide lasers described herein. Applying these design principles may result in providing waveguide lasers with laser active ions of the 3d and 4f transition metal ions in single-crystalline oxide and fluoride laser host lattices, and in any of the laser glasses of interest, especially phosphate, silicate, fluorophosphate and fluoride glasses.

Another variation of the described waveguides laser may include a segmented core. Two ore more core sections may be joined with a laser-inactive segment of essentially similar refractive index to allow for space requirements and efficient placement of many commercially available laser diode bars for side pumping. This type of arrangement may provide practical solutions for scaling waveguide lasers to higher powers and avoiding unpumped core areas which, in turn, may give rise to ground state absorption losses of quasi-3-level laser systems. In addition to providing segments between laser-active core sections, laser-inactive or saturable absorber sections may be placed at the ends of at least one of the core sections, for instance, to provide waveguiding of input or output radiation. Another variation of the invention provides a waveguide structure with an undoped guiding core. This core may have a cross section of 10 µm×10 µm, and may further include cladding layers of laserable material surrounding it on its four sides, with a thickness of the cladding layers of 15 µm each. The core may of course be formed with other configurations that may be surrounded by one or more cladding layers. One end face of the waveguide component may be coated uniformly with a high-reflectivity (HR) dielectric coating. The second end face may be selectively HR coated over the clad regions while the core has a coating deposited on it that serves as output coupler for the generated laser radiation. In another variation of this design, the core section may be recessed from the end face by 0.5 mm, and thereby readily differentiable in terms of coating deposition. The undoped guided core of an originally uniformly HR coated end face may be also selectively ion milled to produce an output coupler coating over its surface. This configuration of a waveguide laser may provide a purely diffraction limited output by collecting laser radiation generated in the doped cladding and retaining only the diffraction limited portion.

Figure 3:
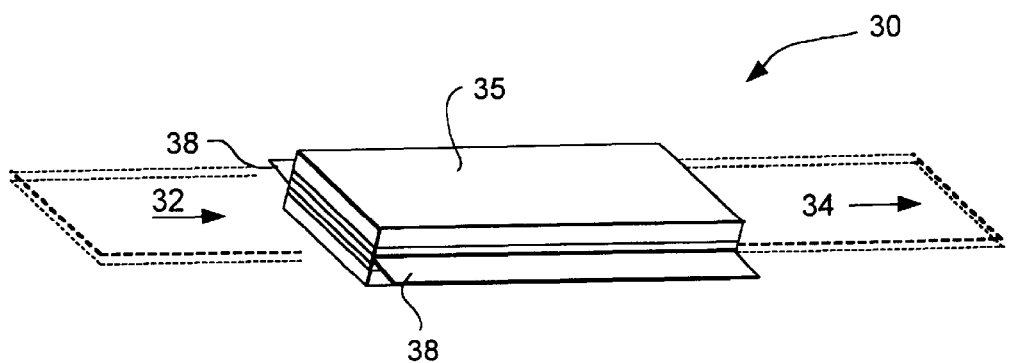
FIG. 3 provides a perspective view of a compound waveguide laser gain element configured as a laser amplifier with laser diode bars positioned along the longitudinal sides of the waveguide.

The compound waveguide gain elements described herein may be readily configured as an amplifier 30 as shown in FIG. 3. The gain element 35 may consist of five layers and have two adjacently positioned semiconductor laser diode bars 38 that serve as pump excitation sources. In addition to using these waveguides 35 in laser oscillators, they can also be used as amplifiers where an incoming optical beam 32 is aligned to pass through the central portion of the waveguide structure 35 and under go amplification as it traverses the structure. The laser diode bars 38 may be positioned substantially adjacent to the sides of the waveguide 35 for their injection of pump radiation into the pump radiation-guiding portion of the waveguide. The sides or ends of the waveguide 35 may of course include anti-reflective optical coatings at the pump wavelength to increase the coupling efficiency of the pump radiation into the waveguide. Optical coatings that are anti-reflective at selected wavelengths may be applied to any surface in which the laser beam enters and exits in an effort to increase the efficiency of the amplification process. Furthermore, the ends of the waveguide amplifier 30 may be planar or any other curved or linear configuration. The laser radiation to be amplified 32 may be incident on one end of the amplifier 30, and after traversing the central portion of the amplifier, the amplified laser radiation 34 may exit at the opposite or other end of the waveguide structure 35. The compound waveguides described herein provide an improved technique of coupling pump radiation into the waveguide containing the gain medium. When configured as either a waveguide amplifier or laser, the additional confinement layers create another guided layer in addition to that containing the gain medium. The plurality of additional guiding layers may serve to efficiently confine pump radiation, and more effectively pump an active or laserable region within a gain medium. These compound planar waveguide structures further allow for the capture of energy that may be emitted at high divergence angles by laser diode bars, and the confinement of that energy into a waveguide containing the gain medium. These improved pumping schemes may thus generate relatively high gain in the gain media. For compactness, the dimensions of the gain media may also be small relative to those of standard devices. The conventional single-mode fiber or rectangular waveguides may be scalable but generally leads to drastically extended waveguide lengths. Meanwhile, with the planar waveguide geometry adopted herein, the spectral and spatial coherence of the device output may be controlled both by the waveguide and resonator configuration. In applications were the spatial coherence afforded by the waveguide is insufficient, the high gain may allow for the use of an unstable resonator. The compound waveguides provided herein may be formed of layers of materials with selected optical properties, and may be bonded together thermally, optically or otherwise, from layer to layer along their relative interfaces to provide a structure that is relatively strong enough to undergo further finishing processes and withstand other demands placed upon it by subsequent formative and fabrication methods.

Another variation of this embodiment may provide an optically pumped solid state planar waveguide amplifier formed with a substantially rectangular shape or any other desired configuration. The amplifier may include a planar medium that is capable of sustaining a population inversion. The planar laser medium may be centrally disposed along an optical axis formed along the direction of incoming light rays, and may include an optically inert host lattice and an optically active admixted species. At least two planar cladding layers with an inner surface and an outer surface may be positioned adjacent to the planar medium wherein the inner surface of each cladding layer is respectively bonded to the upper and the lower surface of the planar medium. The interface between the inner surfaces of the cladding layers and the planar medium may define a first waveguide by virtue of a first index of refraction discontinuity for spontaneous emission of the medium. The planar medium may be a solid state medium and the cladding layers may be formed of a non-lasing dielectric medium. These and other layers within the amplifier may be joined with an adhesive-free bond such as those provided by thermal or diffusion bonding techniques. Moreover, the interfaces forming the first waveguide may have a discontinuity in the index of refraction due to birefringence in a common crystal. The first waveguide may have a substantially single transverse EM mode by virtue of the ratio of transverse dimension of the first waveguide relative to the wavelength of the stimulated emission of the amplifier, or the difference in indices of refraction across the defining interface of the first waveguide. The outer surfaces of the cladding layers may further define a second waveguide by virtue of a second index of refraction discontinuity for containing radiation from the optical pump source. A first and a second external layer formed of a second non-lasing dielectric medium may be also thermally bonded or otherwise joined to the outer surface of each cladding layer. The second waveguide may be provided by virtue of the index of refraction discontinuity at the interface between the first and the second non-lasing dielectric medium. The second waveguide may also have an acceptance angle greater than or equal to the divergence angle of the optical pump source. Additionally, the amplifier may be configured to receive pump radiation from a pump source that is substantially perpendicular or parallel to the optical axis. A variety of optical coatings may be applied to various external surfaces of the amplifier that are anti-reflective or reflective to the pump radiation wavelength. As with other waveguide laser systems described herein, the optically pumped waveguide amplifier may further include a cooling system with chilling bars or blocks that are in thermal contact with the amplifier.

Figure 4:
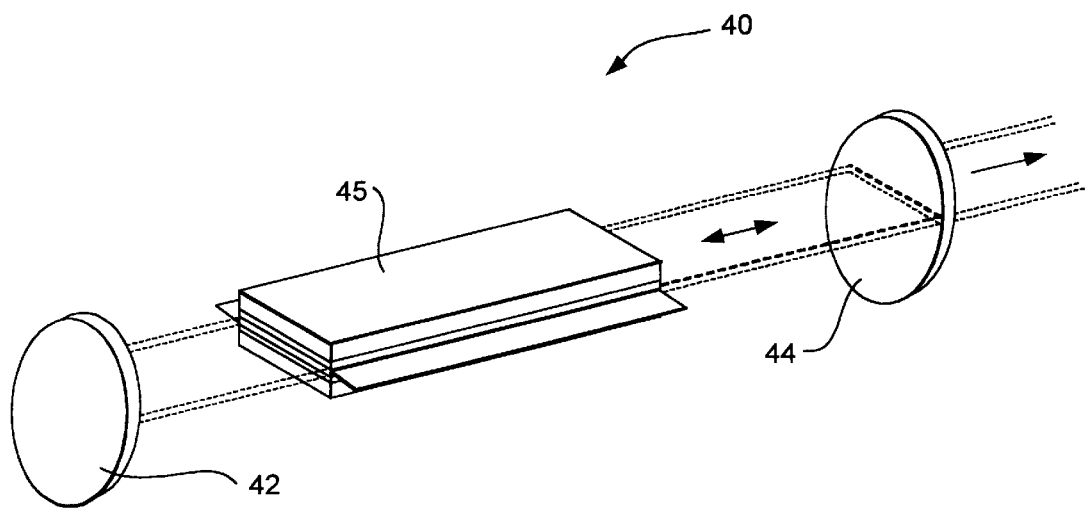
FIG. 4 depicts a side pumped planar compound waveguide laser with a external mirrors that form the laser oscillator region.

FIG. 4 provides another illustration of a compound planar waveguide laser 40 with separate mirrors. A high reflector 42 and an output coupler 44 may be selected for the laser oscillator. The end faces of the waveguide 45 may also have an applied anti-reflection coating at the wavelength of the generated laser radiation to improve the overall efficiency of the system by reducing intracavity losses. This oscillator structure is not monolithic, and includes stand alone discrete optics which serve as its output coupler 44 and its high reflector 42. The non-monolithic features of this embodiment may be of course applied to other variations of compound waveguides described herein.

Figure 5:
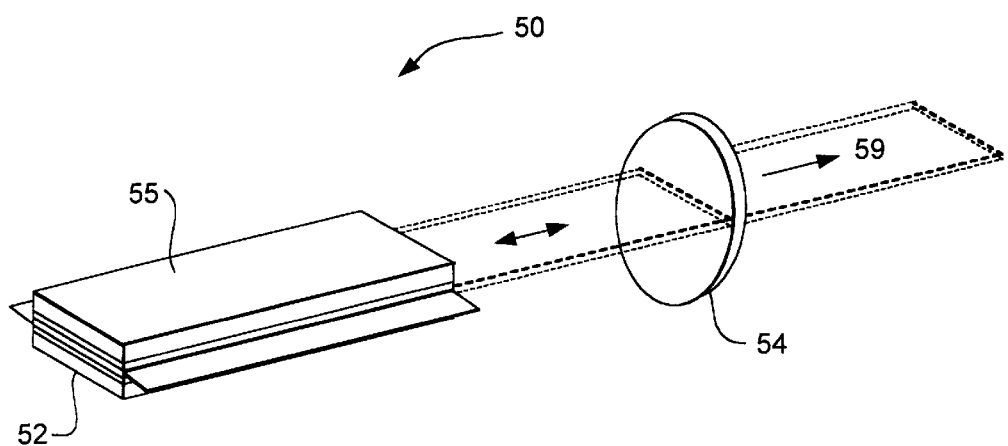
FIG. 5 is an optically pumped waveguide laser with an output coupler that is configured as an external optic.

Yet another embodiment of a laser oscillator 50 is depicted in FIG. 5 that is formed in accordance with the invention. This waveguide may be considered to have a hybrid or intermediate configuration between a monolithic structure (as shown in FIG. 1) and another having external discrete optics (as shown in FIG. 4). The high reflector 52 may be monolithically applied directly to the waveguide structure 55, and the output coupler 54 may stand alone as a discrete optic or external mirror. In this configuration, the high reflector 52 of the waveguide laser 50 may be of course formed by a highly reflective coating at the wavelength of the generated laser radiation 59.

Figure 6:
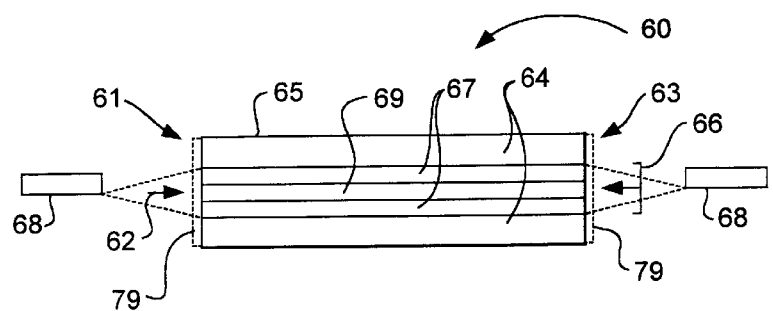
FIGS. 6–7 illustrate various side pump configurations with one or more laser diode bars that can be used with waveguides formed in accordance with the invention.
Figure 7:
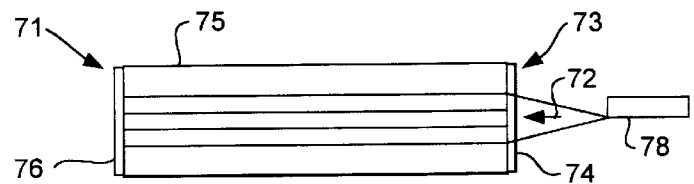

FIGS. 6–7 illustrate additional pump configurations that may be used with the planar waveguide lasers provided herein. One or more laser diodes 68 may pump radiation 62 directly into the pump guiding region 66 of the waveguide laser 60 from the direction of the waveguide sides 61 and 63. By juxtaposing two laser diode bars 68 to the sides 61 and 63 of the waveguide, as shown in FIG. 6, the pump radiation 62 may be transmitted into and confined within the central pump waveguide region 66 consisting of the central 69 and inner cladding 67 layers. An increase in the coupling efficiency of the laser diode pump source 68 to the waveguide structure 65 may be observed when the sides 61 and 63 of the waveguide structure also include an anti-reflection coating 79. The placement of the laser diodes 68 may be of course varied with respect to the waveguide 65 along different portions and distances away from the structure. The planar waveguide lasing device 60 may consist of a three-layer pump waveguide that includes two optically coated opposing end faces or surfaces 61 and 63 configured for laser oscillator operation. The waveguide 65 may have a core layer 69 formed with two opposite external planar surfaces consisting of a laserable medium with a refractive index $n_1$. In addition, two laser-inactive inner cladding layers 67 with a refractive index $n_2$ may be each positioned substantially adjacent to an external planar surface of the core layer 69. The refractive index of the central layer 69 may be greater than the cladding layers 67 ($n_1 > n_2$). The exterior surfaces of the inner planar cladding layers 67 may be additionally sandwiched by or positioned relatively adjacent to a first and a second external layer 64 formed of non-laserable material with a refractive index of $n_3$ wherein $n_2 > n_3$. An optical pump radiation source 68 may be further selected for transmitting pump radiation 62 to the core 69 and inner cladding 67 layers to generate laser radiation output from the planar waveguide 65. The received optical pump radiation 62 may be absorbed in the core layer 69 in at most two passes. All or some of the layers of the waveguide may be joined with an adhesive-free bond using as optical or thermal bonding techniques described herein. In addition, the planar waveguide lasing device 60 may further include a cooling system (not shown) positioned substantially adjacent to the planar waveguide 65 for removing heat from the apparatus. The cooling system may include cooling blocks, bars or other heat transfer elements. FIG. 7 illustrates another variation of the invention that includes a single laser diode bar 78 for directing pump radiation 72 into a selected side 73 of the waveguide structure 75. In addition to double or multiple-sided pumping, radiation may be also coupled or directed into a single side or end of the waveguides described herein. In this configuration, pump efficiency may be improved by applying an optical coating 76 that is highly reflective at the pump wavelength to the side 71 of the waveguide structure 75 that is opposite to the diode pump source 78. This may allow the diode pump radiation or light 72 to be effectively double-passed through the waveguide structure 75. In addition, an anti-reflection coating 74 may be applied to the side 73 of the waveguide structure 75 which serves as the input surface to further increase the coupling efficiency of the laser diode pump source 78 and the waveguide 75.

Figure 8:
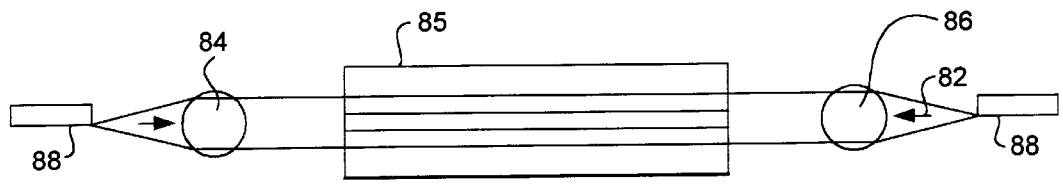
FIGS. 8–9 provide simplified end views of a side pumped waveguide having a cylindrical lens for directing laser diode pump radiation before its delivery to the waveguide structure.
Figure 9:
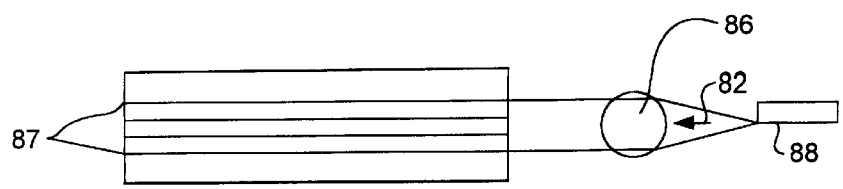

As shown in FIGS. 8–9, one or more cylindrical lens 84 and 86 may be used to collect and direct the diode pump radiation 82 emitted by laser diodes or pump sources 88 into a planar waveguide structure 85. Although light 82 from a laser diode bar or pump source 88 may be directly coupled into the waveguide 85, it may also be convenient to use intermediate optics 84 and 86 between the diode bar and the waveguide structure. A cylindrical lens or microlens 84 and 86 may both collect and collimate the diode light 82 prior to its injection into the waveguide pump region 87. By applying this scheme to the compound waveguides described herein, the divergence angle of the pump light delivered into the waveguide structure may be decreased or otherwise varied. A more efficient pump coupling with the waveguide may be accomplished with a pump confining structure that has a lower NA than if intermediate coupling optics are not used. Intermediate pump coupling optics may further allow the laser diode array to have a greater range of standoff distances from the waveguide structure. The size and configuration of the pump coupling optics 84 and 86 may of course vary according to selected applications.

Figure 10:
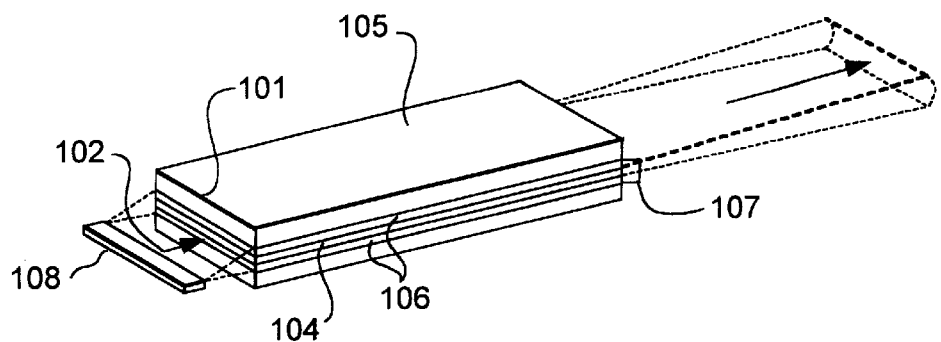
FIG. 10 shows another waveguide pump configuration with a diode bar positioned in proximity to the end of the waveguide to direct pumped radiation.
Figure 11:
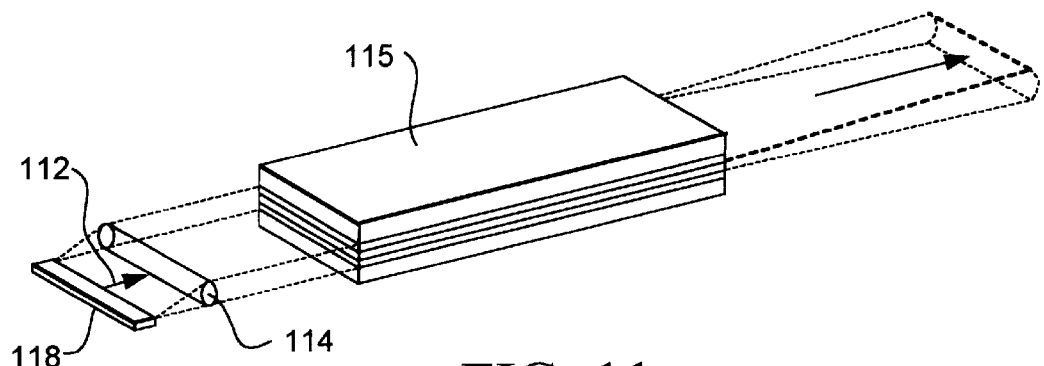
FIG. 11 is a multi-layer planar waveguide with a cylindrical lens for directing pump radiation emitted by an end-mounted laser diode.

Additional pump configurations may be selected for delivering pump radiation to the compound planar waveguide structures described herein as shown in FIGS. 10 and 11. As shown in FIG. 10, a single diode bar 108 may emit pump radiation 102 that is directly coupled or directed into the pump guiding region 107 through the end of a compound planar waveguide 105. By juxtaposing at least one laser diode bar 108 next to the end surface 101 of the waveguide 105, the pump radiation 102 may be transmitted into and confined to the central region 107 of the waveguide structure 105 comprising a central laserable core 104 sandwiched between adjacent cladding layers 106. The waveguide end through which pump radiation 102 is transmitted may also include a high reflector in the laser cavity, and may have a dichroic optical coating applied to it. The optical coating may be highly reflective at the wavelength of the generated laser radiation, but transmissive at the wavelength of the pump radiation. As shown in FIG. 11, a cylindrical lens 114 may be further provided to first collect and direct the diode pump radiation 112 emitted by the laser diodes 118 before it is delivered into the waveguide structure 115. As with other side pumping configurations described herein, it may be preferable in particular situations to include an intermediate coupling optic 114 between the laser diode bar 118 and the waveguide structure 115. Any combination of side and/or end pump configurations by one or more sources may be selected so waveguide structures provided in accordance with the invention may be pumped from multiple or different directions. For example, a substantially rectangular planar waveguide may be side pumped and end pumped together so pump radiation is introduced into the compound waveguide from three of its sides simultaneously or in a time controlled manner. Laser diode pump lasers may be configured to emit radiation at a wavelength that is absorbed by the dopant ion used as the active lasant in the waveguide to provide a laser oscillator. One or more intermediate optics may be positioned between the waveguide and pump radiation sources, and selected reflective and anti-reflective coatings at predetermined wavelengths may be further added to waveguide side surfaces. The waveguide may further include monolithically applied reflectors or separate and discrete optical components. These planar waveguides may be of course formed with a variety of geometric shapes and configurations as with other structures described herein.

Figure 12:
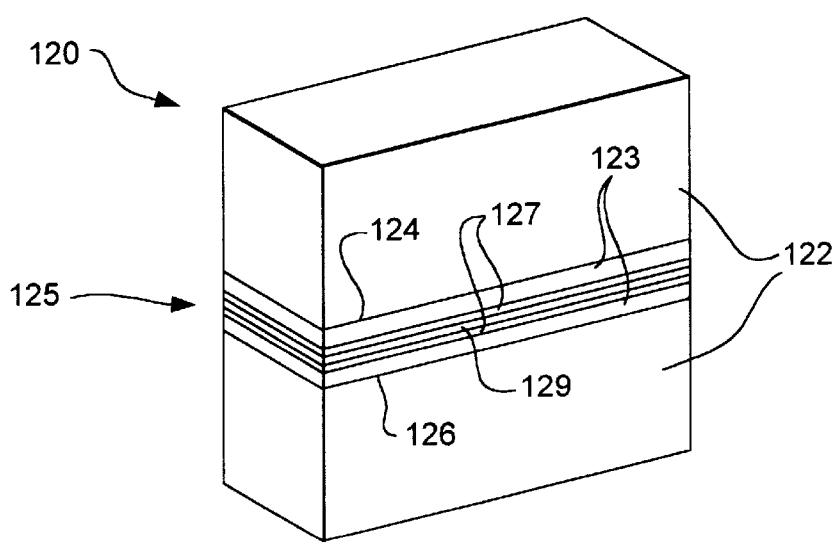
FIG. 12 is a simplified perspective of a thermal management system for a planar waveguide element.

FIG. 12 illustrates a thermal management system that may be selected for the described planar waveguide architecture. Two chill bars or cooling blocks 122 may be placed in thermal contact with the top 124 and the bottom 126 surface of the waveguide 125 through which the heat generated in the laser is extracted. The proximity between the cooling elements 122 and the waveguide 125 may be of course varied. The chill blocks 122 may be constructed of many suitable heat transfer materials, and are preferably formed of materials with high thermal conductivity such as copper, aluminum, sapphire, or synthetic diamond. The heat that is transferred to the cooling blocks 122 may then be removed from the cooling blocks using any number of other conventional heat removal techniques, such as flowing a coolant fluid through the chill blocks or contacting the chill blocks to a thermal electric cooler. The thermal management system 120 shown in FIG. 12 may operate with an optically pumped waveguide laser. The laser may include a pair of reflective mirrors monolithically, or non-monolithically (not shown), formed with a planar waveguide to define an optical cavity with an optical axis. A reflective mirror may be mounted relatively external to the gain medium or monolithically formed with the waveguide. The planar waveguide 125 may be centrally disposed along the optical axis of the waveguide having a plurality of side surfaces. The waveguide 125 may include a gain medium layer 129 formed with an upper surface and a lower surface, and may be capable of sustaining a population inversion. In addition, the inner surfaces of a pair of cladding layers 127 may be respectively bonded to the upper and the lower surface of the gain medium layer 129. The interface formed between each inner surface of the cladding layers 127 and the gain medium layer 129 define a first waveguide section for spontaneous emission of the medium by virtue of an index of refraction discontinuity. Transverse mode discrimination may be accomplished substantially by differential resonator mode losses. In addition, the transverse mode discrimination in the unguided direction may be accomplished through differential resonator mode losses, and/or mode discrimination in the guided direction may be accomplished through the first waveguide. The outer surfaces of the cladding layers 127 define a second waveguide section by virtue of an index of refraction discontinuity for containing pump radiation within the waveguide from an optical pump source. In addition, a first and a second external layer 123 formed of a laser-inactive medium may be respectively positioned substantially adjacent to the outer surface of each cladding layer 127. The interface formed between each outer surface of the cladding layers 127 and each external layer 123 may also define a waveguide section for confinement of pump radiation by virtue of another index of refraction discontinuity. An optical pump source (not shown) may provide pump radiation to the waveguide across at least one side surface of the planar waveguide along the direction of or perpendicular to the optical axis, or along any other direction with respect to the optical axis of the waveguide. The optical pump source may include at least one laser diode, and may be positioned relatively parallel or perpendicular to the optical axis. Pump radiation may be of course injected into the pump region from a variety of other directions relative to the optical axis of the waveguide, and may also provide radiation across a side surface of the planar waveguide that is relatively parallel or perpendicular to the optical axis. As with other described embodiments, external cylindrical lenses or other intermediary optics may be positioned between the optical pump source and the planar waveguide. A variety of suitable reflective and anti-reflective optical coatings may be also applied or included along selected surfaces of the planar waveguide. Additionally, the optically pumped waveguide may further include a medium capable of acting as a saturable absorber/passive q-switch.

Figure 13:
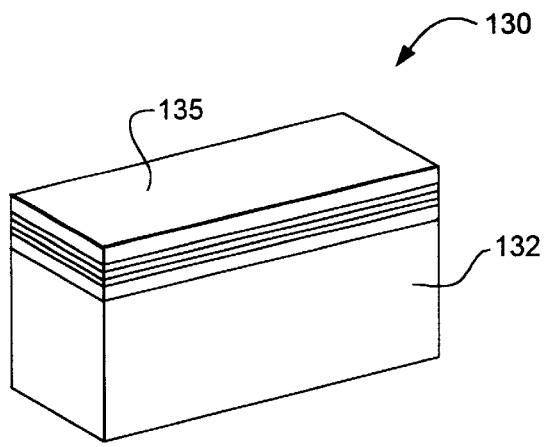
FIG. 13 shows a cooling system or chill block positioned adjacent to a waveguide surface formed in accordance with the invention.

Another embodiment of a waveguide cooling system 130 is shown in FIG. 13 in which only one chill bar or block 132 is in thermal contact with a waveguide 135 surface. This variation of selected cooling architecture may be preferable for particular applications including laser systems where it may be advantageous to leave a planar surface of the waveguide exposed to ambient surroundings. The heat transfer achieved by cooling only one surface of the waveguide 135 may sufficiently remove waste heat generated by the structure. The addition of another top capping block or cooling body may be of course included in addition.

Figure 14:
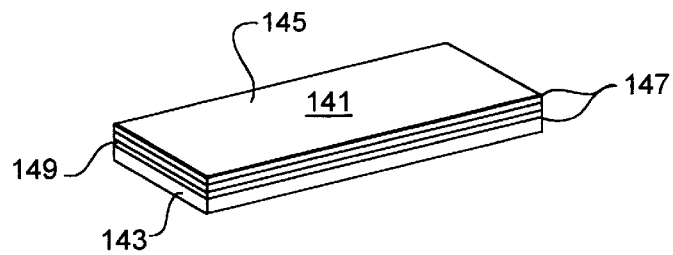
FIG. 14 provides a simplified perspective of another variation of the invention that includes a multi-layer waveguide formed with an external surface that is exposed to ambient surroundings.

FIG. 14 illustrates yet another variation of a compound waveguide geometry provided in accordance with the invention. The top layer of the waveguide 145 may be omitted, and the pump radiation may still remain confined to the top three layers, namely the laserable core 149 and two adjacent cladding layers 147. Cooling of the waveguide 145 may be accomplished by a chill bar (not shown) through a lower external layer 143 or bottom surface of the structure as shown in FIG. 13. The top surface 141 of the waveguide 145, or the external surface of the top cladding layer 147, may be simply left exposed to the ambient surroundings. Even without a top external layer, the pump radiation may be confined by the interface between the external layer 143 and the ambient surroundings. The developed laser radiation may be confined to the laserable core 149 by its interface with each cladding layer 147.

Figure 15:
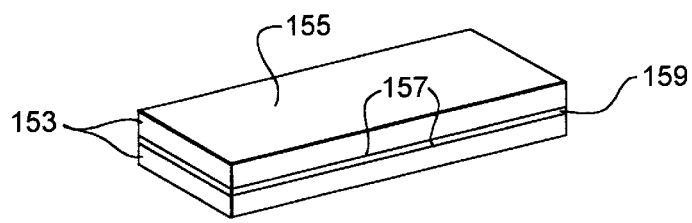
FIG. 15 provides yet another embodiment that is a compound waveguide structure with an intermediate pump cladding region that approaches zero thickness.
Figure 16:
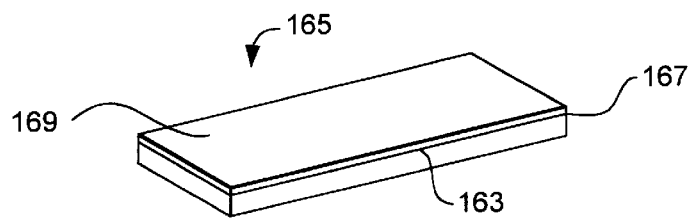
FIG. 16 is an illustration of a waveguide structure having a top layer for confining pump radiation that is exposed to ambient surroundings.

Another configuration for the waveguide systems described herein may be derived by taking the limiting case in which the thickness of the inner pump cladding layers shrinks or goes to zero. This is a degenerate case in which the developed laser radiation and the pump excitation radiation essentially become confined by the same waveguide structure 155. As shown in FIGS. 15–16, the regions forming the pump radiation waveguide and the waveguide that confines the generate laser radiation may essentially converge. As the thickness of the inner or intermediate pump cladding layer 157 approaches zero, the outer pump cladding layers 153 becomes in essence a waveguide section 159 that now serves to confine both the pump and the developed laser radiation. FIG. 16 is another variation of this architecture in which the top outer cladding layer is also omitted. The pump radiation and the developed laser radiation in this configuration may be confined to the top single laserable layer or core 169, and cooling of the waveguide 165 may be also performed with a chill bar or cooling element (not shown) through the lower outer cladding layer 167 and the bottom layer 163 of the waveguide, while the top surface of the core is simply left exposed to the ambient surroundings. The core and cladding compound waveguides described herein may thus provide independent confinement structures for pump radiation and developed laser radiation with numerous layers of either 2, 3, 4 or 5 layers or more in total as described in the above figures.

While all aspects of the present invention have been described with reference to the aforementioned applications, this description of various embodiments and methods shall not be construed in a limiting sense. The aforementioned is presented for purposes of illustration and description. It shall be understood that all aspects of the invention are not limited to the specific materials, parameters, depictions, configurations or relative proportions set forth herein. The specification is not intended to be exhaustive or to limit the invention to the precise forms disclosed herein. For example, the intermediate coupling optics that may be used to deliver the pump radiation into the waveguide structure may be more elaborate than the relatively simplified cylindrical lens shown, and in particular, may consist of several lensing or other optical elements. Furthermore, where single diode array bars are shown, multiple diode array bars may be positioned in a stacked configuration with the coupling optics consisting of multiple lensing elements and/or a lensing duct. Other various modifications and insubstantial changes in form and detail of the particular embodiments of the disclosed invention, as well as other variations of the invention, will be apparent to a person skilled in the art upon reference to the present disclosure. It is therefore contemplated that the appended claims shall cover any such modifications or variations of the described embodiments as falling within the true spirit and scope of the invention.

What is claimed is:

1. A five-layer planar waveguide lasing device comprising:
   a compound planar waveguide positioned between two optically coated opposing surfaces configured for laser oscillator operation having
      a core layer consisting of a laserable medium with a refractive index $n_1$,
      two inner cladding layers with a refractive index $n_2$ wherein the core layer is sandwiched between the two inner cladding layers, and
      two outer cladding layers with a refractive index $n_3$ wherein the core layer and the inner cladding layers are sandwiched between the two outer cladding layers, and wherein $n_1 > n_2 > n_3$ and wherein the difference between $n_1$ and $n_2$ is less than the difference between $n_2$ and $n_3$ to substantially match the gain region of the core with the fundamental lasing mode; and
   an optical pump radiation source for transmitting pump radiation to the core and inner cladding layers to generate laser radiation output from the planar waveguide.

2. The planar waveguide lasing device according to claim 1, wherein all layers of the compound waveguide are joined with an optical adhesive-free bond.

3. The planar waveguide lasing device according to claim 1, wherein the compound planar waveguide is a thermally bonded waveguide laser.

4. The planar waveguide lasing device according to claim 1, wherein the planar waveguide receives optical pump radiation that is substantially absorbed in the core layer.

5. The planar waveguide lasing device according to claim 1 further comprising a cooling system in thermal contact with the planar waveguide for removing heat from the planar waveguide.

6. The planar waveguide lasing device according to claim 1, wherein the laserable medium comprises an optically inert host lattice and an optically active species.

7. The planar waveguide lasing device according to claim 1, wherein the laserable medium of the core layer is formed from a material containing at least one ion selected from the group consisting of: Cerium, Praseodymium, Neodymium, Promethium, Samarium, Europium, Gadolinium, Terbium, Dysprosium, Holmium, Erbium, Thulium, Ytterbium, Chromium, Titanium, and Cobalt.

8. The planar waveguide lasing device according to claim 1, wherein the core layer includes at least one laserable ion contained in yttrium aluminum garnet as a host lattice, and wherein the inner cladding layers consist of laser-inactive undoped yttrium aluminum garnet, and the outer cladding layers consist of sapphire.

9. The planar waveguide lasing device according to claim 1, wherein the core layer has a thickness range of approximately 3–15 microns, each inner cladding layer has a thickness range of approximately 5–15 microns, and each outer cladding layer has a thickness range of approximately 200–4000 microns.

10. The planar waveguide lasing device according to claim 1, wherein the core layer is optically bonded to the inner cladding layers.

11. The planar waveguide lasing device according to claim 10, wherein the core layer is formed of YAG doped with at least one rare earth element, and includes a bonded segment of $Cr^{4+}$:YAG, and wherein the planar waveguide is configured for passively q-switched lasing operation.

12. The planar waveguide lasing device according to claim 1, wherein $Cr^{4+}$ ions are admixed to a laserable material.

13. The planar waveguide lasing device according to claim 1, wherein $Cr^{3+}$ ions are admixed as laserable ions in an optically inert single-crystalline host lattice.

14. The planar waveguide lasing device according to claim 1, wherein the optical pump radiation is transmitted through an optical coating of the waveguide that is anti-reflective at the pumping wavelength in a direction perpendicular to the direction of propagation of the generated laser radiation.

15. The planar waveguide lasing device according to claim 1, wherein the optical pumping radiation is transmitted through an optical coating of the waveguide that is anti-reflective at the pump wavelength in a direction substantially parallel to the direction of propagation of the generated laser radiation.

16. The planar waveguide lasing device according to claim 1, wherein at least one optically coated surface is monolithically applied to the waveguide.

17. The planar waveguide lasing device according to claim 1, wherein at least one optically coated surface is provided on a discrete external optical element.

18. The planar waveguide lasing device according to claim 1, wherein the planar waveguide lasing device includes an unstable laser resonator configuration for providing laser oscillation.

19. The planar waveguide lasing device according to claims 18, wherein the unstable resonator configuration includes a monolithic confocal spherical resonator arrangement.

20. The planar waveguide lasing device according to claims 18, wherein the unstable resonator configuration includes a non-monolithic confocal spherical resonator arrangement.

21. The planar waveguide lasing device according to claim 1, wherein the waveguide is formed with at least two opposite side surfaces, and wherein the optical pump radiation source is a laser beam that enters and exits through the side surfaces of the waveguide, and further comprising an anti-reflective optical coating at the laser wavelength deposited onto at least one side surface of the waveguide through which the laser beam enters and exits to provide a laser amplifier.

22. The planar waveguide lasing device according to claim 1, wherein the core layer and the inner and outer cladding layers are selected from fluoride single crystals.

23. The planar waveguide lasing device according to claim 1, wherein the core layer and the inner and outer cladding layers are formed of at least one material selected from the group consisting of: laser-active and laser-inactive fluoride, fluorophosphate, silicate and phosphate glasses.

24. The planar waveguide lasing device according to claim 1, wherein the core layer is formed of $Cr^{2+}$:ZnSe and the inner cladding layers are formed of ZnSe.

25. The planar waveguide lasing device according to claim 1, wherein the refractive index difference between the core layer and the inner cladding layers is established by different crystallographic orientation of the same crystal host.

26. A planar waveguide lasing device according to claim 1, wherein all five component layers consist of glass of essentially similar viscosity.

27. A planar waveguide lasing device according to claim 26, wherein the waveguide is formed by thermal bonding from a preform structure that is thermally redrawn with proportionate cross-sectional dimensions.

28. A planar waveguide lasing device comprising:
a planar waveguide positioned between two optically coated opposing surfaces configured for laser oscillator operation having
a core layer having two opposite external planar surfaces consisting of a laserable medium with a refractive index $n_1$, and
two planar cladding layers with a refractive index $n_2$ wherein each individual cladding layer is positioned substantially adjacent to an external planar surface of the core layer, and $n_1 > n_2$
two outer planar cladding layers with a refractive index $n_3$ wherein each individual outer planar cladding layer is positioned substantially adjacent to an external planar surface of the relatively inner planar cladding layers, wherein $n_2 > n_3$ and the difference between $n_1$ and $n_2$ is less than the difference between $n_2$ and $n_3$ to direct the fundamental mode towards a central region of the waveguide; and
an optical pump radiation source for transmitting pump radiation to the core and inner cladding layers in the absence of an intermediary optic to generate laser radiation output from the planar waveguide.

29. The planar waveguide lasing device according to claim 28, wherein all layers of the waveguide are joined using an adhesive-free bond.

30. The planar waveguide lasing device according to claim 28, wherein the planar waveguide receives optical pump radiation that is absorbed in the core layer in at most two passes.

31. The planar waveguide lasing device according to claim 28, wherein the optical pump radiation source includes at least one laser diode.

32. The planar waveguide lasing device according to claim 28 further comprising a cooling system positioned substantially adjacent to the planar waveguide for removing heat from the planar waveguide.

33. The planar waveguide lasing device according to claim 32, wherein the cooling system includes cooling blocks.

34. The planar waveguide lasing device according to claim 28, wherein the planar cladding layers have a first and a second exterior surface, and further comprising a first and a second external layer formed of non-laserable material wherein the first and the second external layer is respectively positioned adjacent to the first and the second exterior surface of the planar cladding layers.

35. An optically pumped solid state planar waveguide amplifier comprising:
 a planar medium formed with an upper and a lower surface capable of sustaining a population inversion centrally disposed along an optical axis formed along the direction of the incoming light rays; and
 two planar cladding layers each formed with an inner surface and an outer surface wherein the inner surface of each cladding layer is respectively bonded to the upper and the lower surface of the planar medium, and wherein the interface between the inner surfaces of the cladding layers and the planar medium provide a first waveguide by virtue of a first index of refraction discontinuity for spontaneous emission of the medium, and wherein the outer surfaces of the cladding layers provide a second waveguide by virtue of a second index of refraction discontinuity for containing radiation from the optical pump source;
 and wherein the first index of refraction discontinuity is less than the second index of refraction discontinuity to substantially match the gain region of the planare medium with the fundamental lasing mode at the esclusion of undesirable higher order modes.

36. The optically pumped waveguide amplifier of claim 35, wherein the medium comprises an optically inert host lattice and an optically active admixted species.

37. The optically pumped waveguide amplifier of claim 35, wherein the medium is configured to receive radiation from the pump source substantially perpendicular to the optical axis.

38. The optically pumped waveguide amplifier of claim 35, wherein the medium is configured to receive radiation from the pump source substantially parallel to the optical axis.

39. The optically pumped waveguide amplifier of claim 35 further comprising coatings on external surfaces that are anti-reflective to the pump radiation wavelength.

40. The optically pumped waveguide amplifier of claim 35, wherein the planar medium is a solid state medium and the cladding layers are formed of a non-lasing dielectric medium, and wherein the first waveguide is formed by the discontinuity surface of the index of refraction between the solid state medium and the non-lasing dielectric medium.

41. The optically pumped waveguide amplifier of claim 35, wherein the interfaces forming the first waveguide have a discontinuity in the index of refraction due to birefringence in a common crystal.

42. The optically pumped waveguide amplifier of claim 35, wherein the planar medium and the cladding layers are joined with an adhesive-free bond.

43. The optically pumped waveguide amplifier of claim 35, wherein the first waveguide has a substantially single transverse EM mode by virtue of the ratio of transverse dimension of the first waveguide relative to the wavelength of the stimulated emission of the amplifier.

44. The optically pumped waveguide amplifier of claim 35, wherein the first waveguide has substantially a single transverse EM mode by virtue of the difference in indices of refraction across the defining interface of the first waveguide.

45. The optically pumped waveguide amplifier of claim 35, wherein the two planar cladding layers are formed of a first non-lasing dielectric medium, and further comprising a first and a second external layer formed of a second non-lasing dielectric medium, wherein the first and the second external layer are respectively adjacent to the outer surface of each planar cladding layer so that the second waveguide is provided by virtue of the index of refraction discontinuity at the interface between the first and the second non-lasing dielectric medium.

46. The optically pumped waveguide amplifier of claim 45, wherein the first and the second external layers are each joined to a planar cladding layer by thermal bonding.

47. The optically pumped waveguide amplifier of claim 45, wherein the second waveguide has an acceptance angle greater than or equal to the divergence angle of the optical pump source.

48. The optically pumped waveguide amplifier of claim 35 further comprising a cooling system in thermal contact with the amplifier.

49. The optically pumped waveguide amplifier of claim 48, wherein the cooling system includes chilling bars.

50. An optically pumped waveguide laser comprising:
 a pair of reflective mirrors defining an optical cavity with an optical axis;
 a planar waveguide formed with at least one side surface disposed along the optical axis having
  a gain medium layer having an upper surface and a lower surface capable of sustaining a population inversion, and
  two planar cladding layers each formed with an inner surface and an outer surface wherein the inner surface of each cladding layer is respectively bonded to the upper and the lower surface of the gain medium layer, and wherein the interface between the inner surfaces of the cladding layers and the gain medium layer define by virtue of an index of refraction discontinuity a first waveguide for spontaneous emission of the medium, and wherein the outer surfaces of the cladding layers define by virtue of an index of refraction discontinuity a second waveguide for containing radiation within the waveguide; and wherein the index of refraction discontinuity for the first waveguide is less than the second index of refraction discontinuity for the second waveguide to substantially match the gain region of the planar medium with the fundamental lasing mode; and
 an optical pump source for providing radiation to the waveguide across at least one side surface of the planar waveguide in the absence of an intermediary optical element.

51. An optically pumped waveguide laser as recited in claim 50, wherein at least one reflective mirror is mounted relatively external to the gain medium.

52. An optically pumped waveguide laser as recited in claim 50, wherein at least one reflective mirror and the gain medium are formed as a monolith.

53. An optically pumped waveguide laser as recited in claim 50, wherein the transverse mode discrimination is accomplished substantially by differential resonator mode losses.

54. An optically pumped waveguide laser as recited in claim 50, wherein the transverse mode discrimination in the unguided direction is accomplished through differential resonator mode losses and mode discrimination in the guided direction is accomplished through the first waveguide.

55. An optically pumped waveguide laser as recited in claim 50, wherein the transverse mode discrimination is accomplished by the first waveguide.

56. An optically pumped waveguide laser as recited in claim 50 further comprising a medium capable of acting as a saturable absorber/passive q-switch.

57. An optically pumped waveguide laser as recited in claim 50 further comprising a first and a second external layer formed of a laser-inactive medium wherein the first and the second external layer is respectively positioned substantially adjacent to the outer surface of each cladding layer.

58. An optically pumped waveguide laser as recited in claim 57, wherein the optical pump source includes at least one laser diode.

59. An optically pumped waveguide laser as recited in claim 57, wherein the optical pump source is positioned relatively parallel to the optical axis.

60. An optically pumped waveguide laser as recited in claim 57, wherein the optical pump source is positioned relatively perpendicular to the optical axis.

61. An optically pumped waveguide laser as recited in claim 57, wherein the optical pump source provides radiation across a side surface of the planar waveguide that is relatively parallel to the optical axis.

62. An optically pumped waveguide laser as recited in claim 57, wherein the optical pump source provides radiation across a side surface of the planar waveguide that is relatively perpendicular to the optical axis.

63. An optically pumped waveguide laser as recited in claim 57 further comprising an external cylindrical lens positioned between the optical pump source and the planar waveguide.

64. An optically pumped waveguide laser as recited in claim 57, wherein at least one side surface of the planar waveguide includes an optical coating.

* * * * *